April 10, 1962  R. W. CARVER  3,029,178
PLASTIC LAMINATING PRESS
Filed Sept. 26, 1957  2 Sheets-Sheet 1
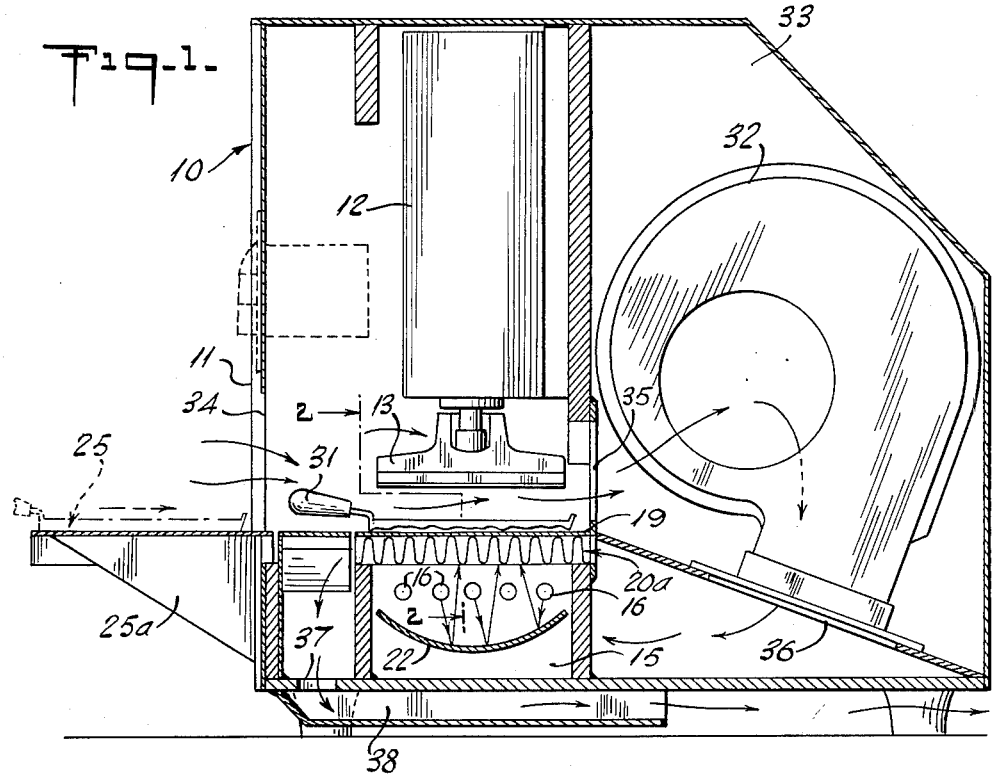
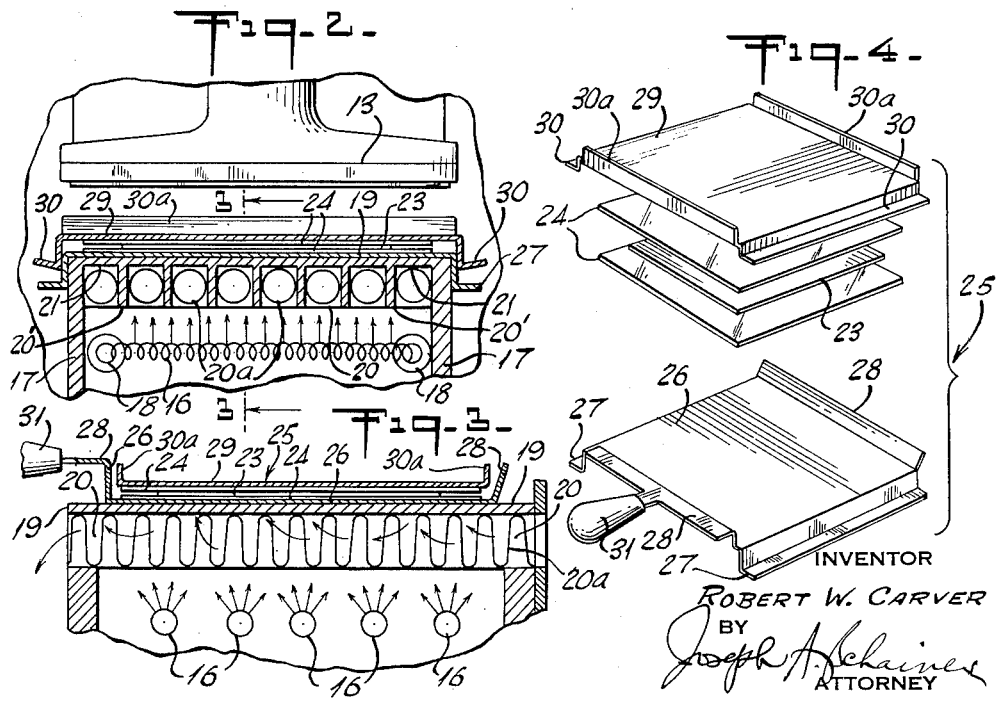
INVENTOR
ROBERT W. CARVER
BY
ATTORNEY April 10, 1962 R. W. CARVER 3,029,178
PLASTIC LAMINATING PRESS
Filed Sept. 26, 1957 2 Sheets-Sheet 2

TIMING PROGRAM

INVENTOR
ROBERT W. CARVER
BY
Joseph A. Schaines
ATTORNEY

United States Patent Office 3,029,178
Patented Apr. 10, 1962

3,029,178
PLASTIC LAMINATING PRESS
Robert W. Carver, Fairmount Ave., Chatham, N.J.
Filed Sept. 26, 1957, Ser. No. 686,306
9 Claims. (Cl. 156—359)

This invention relates to a laminating press and is more particularly directed to a press and associated heating and cooling apparatus for laminating sheet thermoplastic materials to form articles of identification and similar articles.

Generally in various phases of business, education and general services there arises at some time or other the need for the immediate production and preservation of such articles as identification cards, passes and the like. To adequately preserve such articles in their original state or form it is generally necessary and preferable to apply some form of protective coating thereto in the form of plastic, poly vinyl resins, and the like. The formation and application of such protective coating to the articles generally requires an adequate type of laminating press within which the article to be protected is first placed, sandwiched between two plastic sheets and heat and pressure subsequently applied. The final result is a generally singular laminated preservable plastic article. Present available presses are not readily adapted for general office use because of their inability to function automatically, rapidly and efficiently, nor are they adapted for quick operation for a number of reasons including the generally slow cooling systems utilized in cooling the press, and the necessity of constant operator attention. In order to properly fuse or laminate thermoplastic sheets, heat, pressure, time and cooling of the materials laminated must be carefully and accurately applied in proper sequence according to the physical properties of the particular plastic used. This invention provides a novel and improved device for laminating thermoplastic sheets that automatically controls the application of heat, pressure and cooling to produce a finished laminated article and overcomes the aforementioned difficulties with prior devices.

Another object of this invention resides in the provision of a laminating press for producing plastic laminated articles which is portable, efficient, fast acting, automatic, simple and inexpensive to operate and which meets the requirements of heat, pressure, time and cooling in proper sequence to effect good plastic laminations.

Another object of this invention is to provide a laminating press which is rapidly heated and cooled and well adapted for office use in producing laminated articles rapidly and which is suitable for intermittent or quick occasional use as the need arises.

A still further object of this invention is to provide a laminating press having material handling equipment to facilitate alignment and registration of the sheet plastic materials before and during application of heat and pressure, and to restrict and control the flow of plastic during the time heat and pressure are applied.

Other objects, novel features and advantages of this invention will become apparent from the following specifications and accompanying drawings therein:

FIG. 1 is a side elevational view in section of the laminating press and the air-cooling system associated therewith according to the invention;

FIG. 2 is a sectionalized view through the line 2—2 of FIG. 1;

FIG. 3 is a sectionalized view through the line 3—3 of FIG. 2;

FIG. 4 is an exploded perspective view of the plate holder assembly, the plastic sheets and article to be laminated;

Figure 5:
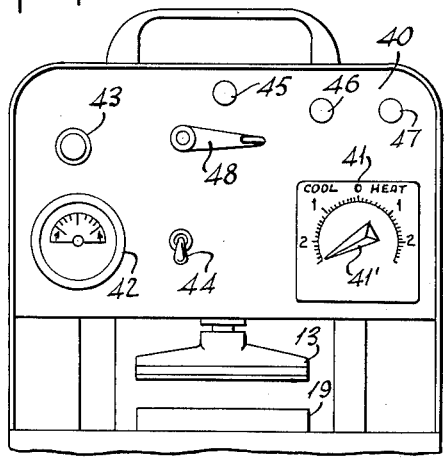
FIG. 5 is a front view of the apparatus shown in FIG. 1.

Referring to the drawings there is shown a laminating press according to the invention generally designated by the reference 10 which includes a structural housing 11 preferably of steel and the like. Within the upper part of housing 11 is a hydraulic piston 12 having a pressure platen 13 at the lower extremity thereof for engaging, under pressure, the plastic sheet material to be laminated when disposed in a sheet holder or tray assembly 25. The housing or frame 11 further contains an enclosed oven compartment 15 at the lower portion thereof which includes therein an electric coil type radiant heating element 16 horizontally held in relation to the oven walls 17 by means of insulating ring supports 18 below the roof of the oven as formed by the oven heating platen 19. The oven heating platen 19 has a generally flat upper surface and a lower surface with horizontally grooved channels 20 forming fins 20' transverse to the heating elements. Disposed within each of the grooved channels 20 is a spirally shaped elongated metal conductor 20a which creates greater turbulence in the air stream and aids in conducting heat away from the fins 20' and oven heating platen 19 during the cooling-off period. Other types of surface conductors can be utilized within the grooved channel spaces, their prime function being to assure a maximum amount of surface area in a fixed space to effect cooling as rapidly as possible. The horizontal portions 21 of the oven heating platen 19 between fins 20' are preferably coated black with any suitable heat absorbent compound coating material to increase the heating rate of the platen when the radiant heating elements are energized in accordance with the well known black body principles of heat absorption and power engineering.

The oven 15 further includes below the radiant heating elements 16 a reflector 22 for intercepting and reflecting radiant heat from the heating elements and direct same onto the oven platen 19 above to assure more rapid and efficient heating.

FIG. 5 of the drawings shows the front of the apparatus of FIG. 1 including the press platen 13 and the stationary platen 19. The front control panel is generally denoted by the numeral 40 and includes a timer 41, a pressure indicator 42, a fuse holder 43, power switch 44, pilot lights 45, 46 and 47, and an arm 48 for releasing the press 12 upon completion of the laminating operation to remove the finished article.

Figure 6:
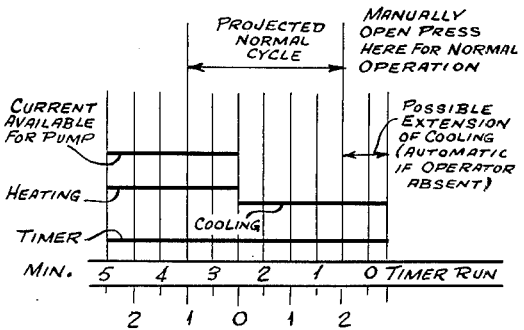
FIG. 6 is a graph showing the timing cycle of the illustrated embodiment of the invention.
Figure 7:
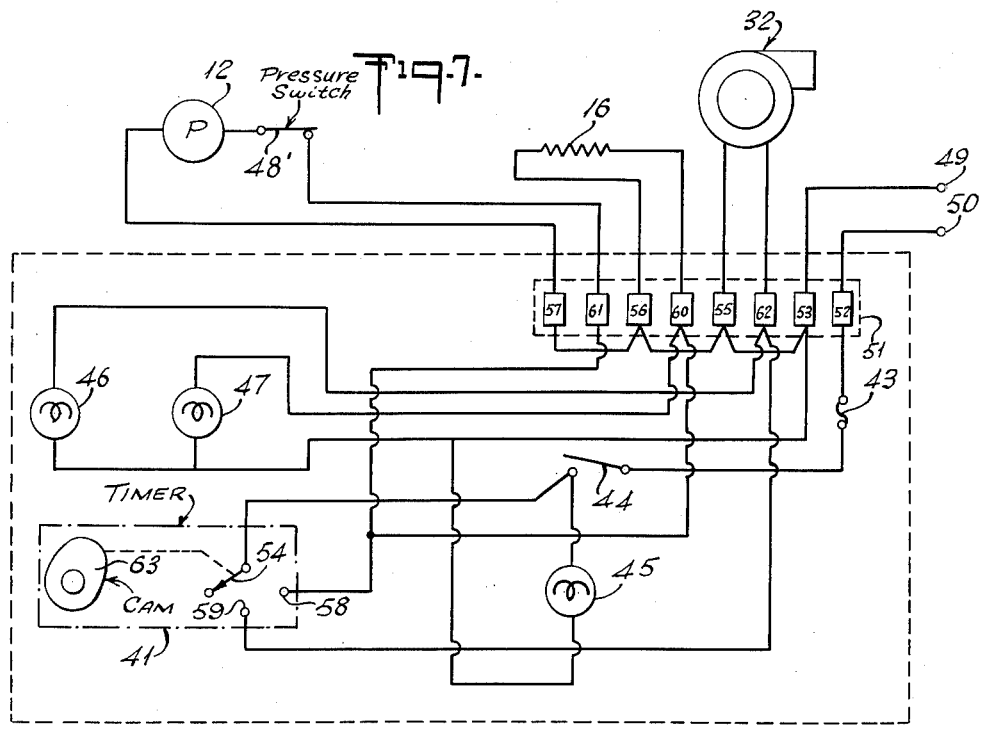
FIG. 7 is a circuit diagram of the invention.

The cycling of the press and control circuitry are shown in FIGS. 6 and 7. Referring first to the circuit diagram power applied to terminals 49 and 50 is fed to terminals 52 and 53 on the terminal block 51. The terminal 52 is connected through fuse 43 and switch 44 to the main pilot light 45 and to the contact arm 54 of the timer 41 which is shown in the off position. The terminal 53 is connected to the pilot light 45 and to terminals 55, 56 and 57 to complete one side of the power circuit to the fan 32, heater 16, and pump 12 (through switch 48') respectively. The timer switch contact 58 is connected to terminal 60 which in turn is connected to heater 16 and pilot light 47, the latter having its other terminal connected to terminal 53 on the strip 51. The switch contact 58 is further connected to terminal 61 on strip 51 for energizing the pump and press 12. The timer switch contact 59 controls the blower 32, through the terminal 62. A pilot light 46 is connected between terminals 62 and 53 to indicate operation of the blower.

To operate the press, the timer knob 41' is moved to the numeral 2 on the "heat" side of the timer. This will start the press displacement of cam 63 which moves by the timer switch arm 54 to the contact 58 and provides a period of heating. The particular heating period is preferably selected for the particular plastic being used. After the heat cycle is started, the press requires 10 to 20 seconds before actually applying pressure to the plastic material being laminated whereupon both heat and pressure are applied for the duration of the heating cycle. When the pointer 41' reaches the zero position, heat is removed by movement of switch arm 54 from contact 58 to contact 59 by the action of cam 63 and the cooling cycle is started. Pressure remains on the article being laminated during the cooling cycle. Upon completion of cooling, the lever 48 is actuated to release the press so that the article can be removed.

An article to be laminated, such as an identification card, pass or the like 23, is first sandwiched between a pair of plastic sheets 24 and placed in the holder assembly generally denoted by the numeral 25. The holder assembly includes a lower generally rectangular flat plate 26 preferably of polished aluminum but not limited thereto, having a first pair of downwardly and outwardly extending flanged edge portions 27 and a second pair of upwardly and outwardly extending flanged edge portions 28. An upper plate 29 forming part of holder 25 is also preferably formed of polished aluminum having a configuration similar to the lower plate, including outwardly extending flanged portions 30 and 30a similar to lower plate 26 and adapted to conform to and engage the flanged edge portions 27 and 28 of the lower plate 26. A handle as shown at 31 is secured to the lower plate 26 at one of its extending flanged edge portions 28 to facilitate the handling of the holder assembly in removing it from and placing it in the laminating press. The plates 26 and 29 are so constructed that their flanged portions are adapted to slidably engage each other to permit proper and correct alignment of the sandwiched plastic sheets and article when set for a laminating operation, and to restrict and control the flow of plastic during the laminating process. Said flow usually occurs as a result of the high temperature to which the sheets are subjected, and the flanged edge portions of the plates control such flow in a manner similar to the restricting or retaining walls of molds used in compression molding.

The press in accordance with the invention further includes an improved cooling system for rapidly setting the plastic before removal from the holder and thus prepare it for immediate reloading. The cooling system provides generally for the flow of forced air through passages within the press frame and about the heated platen and holder assembly in a manner that effects rapid cooling of the heated portions of the apparatus and prevents heat accumulation during continued operation of the apparatus. For this purpose an air blower 32 is mounted in the rear portion 33 of the housing 11 remote from the piston 12 and oven compartment 15. Air is first sucked into the housing 33 through an opening 34 in the front of housing 11 and 33 thereof then around and over the exposed surfaces and edge portions of the press platen 13 and plate assembly 25 just after a completed heating operation. This initial air flow effects cooling of the plate assembly and more readily so since the assembly has outwardly extending flanged surfaces, which serve as radiating fins during this first air pass and are well suited for intercepting the air flow and for conducting heat away from the laminated article. The flanges of the holder assembly serve a double purpose, namely, as radiating fins for heat dissipation, as well as for aligning of the stack and controlling the flow of the plastic. The air then leaves the area between the piston 12 and oven compartment 15 through an opening 35 in the central housing wall, remote from the front portions of the housing 11 and into the blower 32. The air is then discharged through port 36. A second passage of the air, through the directly heated portions of the press takes place through the grooved channel or finned portions 20 of the oven platen 19. The air discharged from the blower port 36 is directed toward and flows through the channels of the oven platen to effect further cooling of the oven platen in all its parts. Further, the elongated spirally shaped metal conductors 20a in the grooved channels effect a more rapid transfer of heat to the air and thus effects more rapid cooling. Finally the air after flowing through the press oven platen is discharged downwardly through a lower opening 37 of the frame to the bottom-most compartment 38 of the frame below the oven enclosure and then rearwardly for discharge through compartment 38, thus removing any latent heat buildup within the walls of the oven and in the lower press frame parts. The passage of air through the bottom-most compartment 38 effects further cooling of the oven enclosure or compartment. With this cooling system, a three-way passage or forced air flow through the structure is obtained and the heated parts of the structure are effectively and rapidly cooled, thus materially reducing the time required for each laminating process.

In operation of the foregoing embodiment of the invention a suitably shaped article 23 is first sandwiched between a pair of plastic sheets 24 and the group placed in the holder assembly 25 which automatically aligns the sheets. The holder assembly is then placed on the oven platen in direct contact with it by sliding the tray assembly 25 along the loading platform 25a into position directly below the platen 13 whose design configuration generally conforms with the lower platen and plate assembly. Heat and pressure are then applied to the assembly to form the lamination. The amount of heat, pressure and the time during which they are applied, are parameters which are variable and a function of the thickness and type of plastic sheets used.

The laminating press, through an improved arrangement of elements automatically applies heat, pressure and cooling in proper sequence and for required times and degrees to best accomplish a lamination. The cycle as illustrated in FIG. 6 includes the following steps.

(1) Heat only is immediately applied to the oven and transferred through oven plate to holder assembly and on to plastic article. This pre-heats and properly conditions the plastic before pressure is applied.

(2) While the lamination is being pre-heated, the piston of press 12 moves slowly downwardly (10 to 20 seconds) and makes contact with the upper plate 29. It then automatically applies pressure to the previously pre-heated or conditioned plastic article.

(3) Heat and pressure remain on the article together for a predetermined period as determined by the setting of the timer.

(4) Heat is stopped and cooling air applied together with pressure for a predetermined period to set the lamination.

(5) Pressure is released to allow removal of the finished lamination.

(6) Cooling air remains on for an additional period (during removal of the finished lamination), then automatically shuts off, completing the cycle.

This last step (6) which takes place during the time of normal removal of the finished lamination and preparation for the next succeeding lamination (a period of 10–20 seconds) assures sufficient cooling of the press oven and frame and does away with any slow and progressive latent heat accumulation in the equipment requiring frequent shut-down periods for cooling.

While only one embodiment of the invention is shown and described it is understood that modifications alterations and changes may be made without departing from the true scope and spirit thereof as defined by the appended claims.

What is claimed is:

1. A laminating press for laminating plastic sheets and similar articles comprising in combination a housing, a fixed, finned platen, a pressure unit mounted within said housing, heating means including a plurality of coil type radiant electrical heaters within said housing in air spaced relation to said finned platen and to each other for heating the platen and plastic sheets, a removable holder for holding the plastic sheets in alignment within the housing and between pressure and heating means, means for cooling the press and laminated article, and means automatically controlling the application of heat, pressure, and cooling to fuse and laminate said plastic sheets and articles and maintain the press at a normal operating temperature.

2. A laminating press according to claim 1 including a reflector in proximity to said heaters and disposed to receive and reflect radiant heat onto the fixed platen.

3. A laminating press for laminating plastic sheet articles comprising in combination a housing, a hydraulic press including a pressure platen mounted within the housing, a fixed platen positioned in opposition to the pressure platen, an oven including heating means, downwardly extending fins on said fixed platen forming channel portions therebetween, a holder assembly for holding plastic sheets in alignment one with the other and with the press, said holder slidably engaging the fixed platen for movement into and out of the laminating position in the press, heat conductors within said grooved channel portions, and means including a blower for cooling the platen and holder assembly after the plastic sheets have been laminated and for maintaining the press at a uniform operating temperature.

4. A laminating press according to claim 3 wherein each channel portion further includes a surface having black coating thereon for the rapid absorption of heat from the heating means.

5. A laminating press for laminating plastic sheet articles according to claim 3 wherein the holder assembly further comprises an upper plate and a lower plate, said upper plate having two opposite upwardly extending flanges to fit closely about the pressure platen, said lower plate having two opposite downwardly extending flanges to fit closely about the fixed platen, said upper plate having two opposite downwardly extending flanges to fit closely about the downwardly extending flanges of said lower plate, said lower plate having two opposite upwardly extending flanges to fit closely about the upwardly extending flanges of said upper plate, and said lower plate being polished and including a handle mounted thereon.

6. A laminating press comprising a fixed platen having downwardly extending fins, a pressure unit including a movable platen actuated thereby for movement toward and away from the fixed platen, heating means beneath the fixed platen, a blower for circulating air about said platens when in pressure engagement and then about said fins, means between said fins for producing turbulence of the air to accelerate cooling of the fins and platen and means for automatically controlling the operation of the heating, pressure and cooling means.

7. A laminating press according to claim 6 wherein said automatic control means includes timing switch means for successively energizing the heating means, activating the pressure unit to perform the laminating operation, deenergizing the heating means, energizing the cooling means and then deenergizing the cooling means to complete the laminating operation.

8. A laminating press according to claim 6 wherein said pressure unit, platens, heating means and blower are inclosed by a housing having a front opening for access to said platens, said blower is disposed to the rear of said platens for drawing air inwardly through the front opening and about said platens and directing it through said heating means and about the fins, and said housing further includes a chamber below said heating means and communicating with space about said heating means and fins for discharging said air into the atmosphere.

9. A laminating press for laminating plastic sheet articles comprising in combination (1) a housing including therein (i) an oven compartment having a front end, a rear end, an upper side, and a lower side, and characterized by a first opening near its rear end and upper side and a second opening near its front end and upper side, and (ii) a bottom-most compartment having a front end, a rear end, an upper side, and a lower side, and characterized by a first opening near its front end and a second opening near its rear end, said oven compartment and said bottom-most compartment being in heat flow communication across the lower side of said oven compartment and the upper side of said bottom-most compartment, and in air flow communication from the second opening of said oven compartment to the first opening of said bottom-most compartment; (2) a hydraulic press including a movable platen within said housing; (3) a fixed platen at the upper side of said oven compartment, said fixed platen having spaced, downwardly extending fins, and the region within said housing about and above said fixed platen being in air flow communication with said oven compartment at the first opening thereof; (4) heating means below said fixed platen and within said oven compartment; (5) a holder assembly for holding the plastic sheets in alignment and slidably engaging the upper surface of said fixed platen for insertion in and removal from said housing; and (6) a blower mounted in said housing for cooling the press and sheets, said blower being disposed to cause air to flow first about said platens and said holder assembly, then through said oven compartment along the downwardly extending platen fins therewithin, and finally through said bottom-most compartment for eventual discharge out of the second opening in said bottom-most compartment.

References Cited in the file of this patent
UNITED STATES PATENTS

| | | |
|---|---|---|
| 2,089,521 | Wolcott | Aug. 10, 1937 |
| 2,351,058 | Marks | June 13, 1944 |
| 2,521,282 | Butler | Sept. 5, 1950 |
| 2,610,938 | Pasquier | Sept. 16, 1952 |
| 2,622,053 | Clowe et al. | Dec. 16, 1952 |
| 2,630,396 | Langer | Mar. 3, 1953 |
| 2,661,789 | Keller | Dec. 8, 1953 |
| 2,686,552 | Faeber et al. | Aug. 17, 1954 |
| 2,750,320 | Latham | June 12, 1956 |
| 2,804,120 | Dancewicz | Aug. 27, 1957 |